Figure 2:
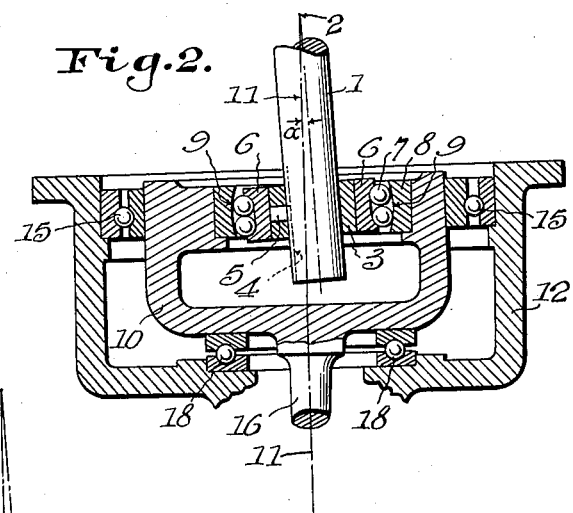

Sept. 16, 1941.      R. E. H. BORNAY      2,256,134

CRUSHER AND LIKE APPARATUS

Filed March 6, 1940

Inventor

Raymond E. H. Bornay

By Baldwin & Wight his Attorneys

Patented Sept. 16, 1941

2,256,134

UNITED STATES PATENT OFFICE 2,256,134

CRUSHER AND LIKE APPARATUS

Raymond Ernest Henri Bornay, Maisons-Laffitte, France

Application March 6, 1940, Serial No. 322,607

7 Claims. (Cl. 74—86)

This invention relates to machines and more particularly to grinders or crushing mills in which a shaft suspended in the manner of a pendulum is to be rotated so that its configuration axis describes a cone having for its apex the suspension point of the said shaft.

An object of the invention is to provide a device which is sturdy, of a simple construction and which can be readily adjusted, disassembled, reassembled and kept up.

Another object of the invention is to place at the disposal of the industry a device of this kind absorbing a power which is as little as possible for a predetermined result, and which becomes heated as little as possible.

Still another object of the invention is to avoid the production of abnormal stresses during the operation of the machine and more particularly to prevent the production of useless flexions of the shaft and unequal stresses in the latter due to the such flexions.

Another object of the invention is to provide the drive of the device for the pendulous rotation of the shaft without using gears.

Finally, another object of the invention is to provide for the possibility of causing the assembly of the friction or rolling parts of the driving device to operate in an oil bath of reduced capacity but the walls of which have a large contact surface with the outside air.

For this purpose, a spherical ball bearing, mounted on the pendulous shaft so that the latter may slide longitudinally in the said bearing is arranged perpendicularly to the axis of the pendulous shaft in a driving member in the form of a cup, the said member rotating in the frame of the machine about an axis which passes through the suspension point of the pendulous shaft with the interposition of a ball bearing located on the level of the spherical ball bearing mounted on the pendulous shaft. The cup-like member extends through the lower part of the frame of the apparatus in the form of a shaft surrounded by a tight packing and carries directly a driving member, as for example a pulley, on the outside of the machine. The said member is preferably carried by a thrust ball bearing, which is sufficiently spaced from the rotation axis of the said member in order that the latter will only be practically submitted to the rotation stress applied thereto.

A modification consists, when the angle formed by the axis of the pendulous shaft and the axis of the driving shaft is very small, in so arranging the outer ring of the spherical ball bearing that it will not be oblique with respect to the axis of the driving shaft. Only the inner ring of the bearing is oblique. This requires an outer spherical ring of sufficient height in order that the balls of the bearing do not escape from the spherical surface.

It is advantageous to give to the lower part of the apparatus frame the form of a tight casing in order that it may be filled with an oil bath in which the transmission parts are bathed. In order to prevent dust and water from reaching the said parts, they are preferably surmounted by a wall which extends upwardly in the form of a stack about the pendulous shaft, this latter carrying a bell which covers the said stack.

Figure 1:
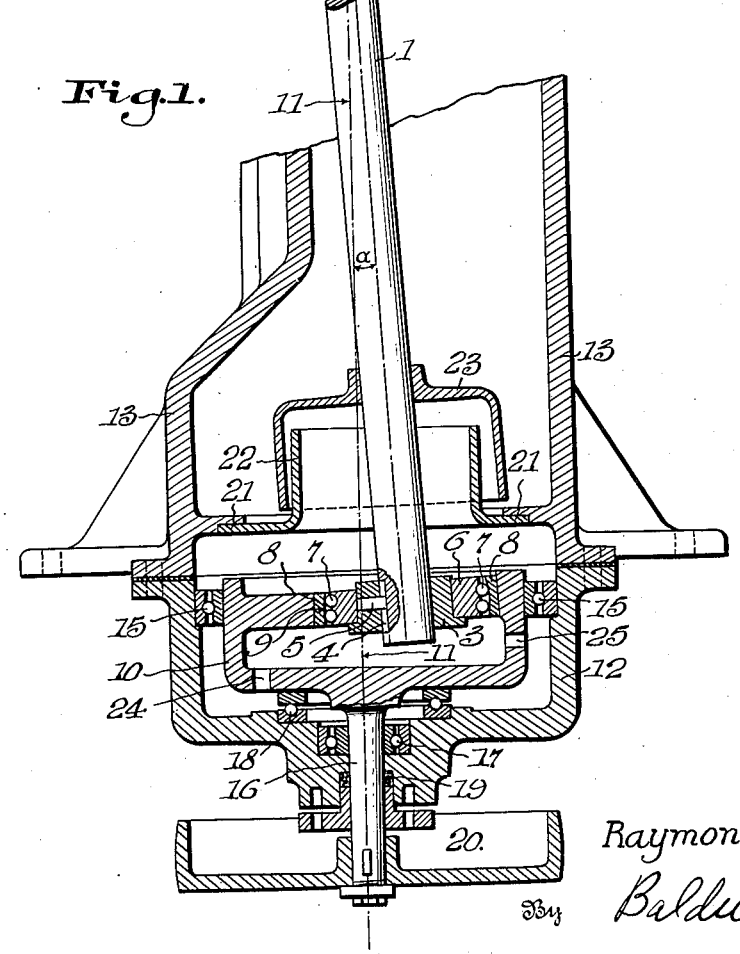

Figure 1 of the appended drawing shows a form of execution of the invention applied to the lower part of a grinder, with a pendulous shaft in which the rotation of the shaft is effected by means of a device according to the invention.

Figure 2 shows a modification of this embodiment.

The pendulous shaft 1 of the grinding machine which is suspended in the point 2 extends through a ring 3 in which it can slide by means of a longitudinal groove 4 in which is inserted a key 5 secured to the said ring 3. The shaft 1 drives the inner ring 6 of a spherical ball bearing in which 7 are the balls and 8 the outer ring, which is provided with a spherical surface 9 the centre of which is on the configuration axis of the pendulous shaft 1. The ring 6 is driven onto the ring 3, so that when the shaft 1 rotates in the spherical ball bearing there is no relative rotation of the ring 3 and of the ring 6, but only a rolling of the balls 7 on the spherical surface 9. The ring 8 is obliquely set into a cup member 10. The obliquity of the ball bearing 6, 7, 8 is complementary of the angle made by the axis 1ª of the pendulous shaft with the configuration axis 11 of the machine passing through the suspension point 2. The spherical ball bearing 6, 7, 8 is offset in the member 10 with respect to the axis 11, of an amount corresponding to the half apex angle α of the cone which the pendulous shaft 1 must describe. The member 10 rotates in the lower part 12 of the frame 13 of the machine by means of a ball bearing 15. The said ball bearing being located at the same level as the spherical ball bearing 6, 7, 8, the transverse stresses due to the reaction of the shaft 1 are directly transmitted to the frame 12 by the upper part of the member 10. The cup member 10 is extended in its lower part by a shaft 16 the configuration axis of which is the axis 11, the said shaft being so mounted that it can rotate in the lower part 12 of the frame of the grinder which forms a tight casing. This assembly is effected by means of a ball bearing 17 and of a thrust ball bearing 18, located at a comparatively large distance from the shaft 16 and at a comparatively short distance from the periphery of the member 10. A packing 19 of known type insures the tightness of the passage of the shaft 16 through the casing 12. On the portion of the shaft 16 which projects outwardly of this casing is keyed a horizontally arranged driving pulley 20. Above the so formed device the frame 13 carries a wall 21 which extends upwardly parallel to the configuration axis 11 so as to form a stack 22. Above this wall 21 and close by its upper surface a bell 23 is secured to the shaft 1 and encloses the stack 22 so as to form a cover for the latter. This bell is wide enough for avoiding that it strikes the stack 22 when the shaft 1 is driven in its conical movement of rotation.

When the pulley 20 rotates the shaft 16, the cup member 10 is rotated. Owing to the spherical ball bearing 6, 7, 8 which is offset in the member 10, the lower part of the shaft 1 describes a cone about the configuration axis 11 of the shaft 16. In this movement there is no relative angular displacement between the ring 3 and the shaft 1; there is only a rolling friction of the balls 7 on the races 9 of the spherical ball bearing. Owing to the fact that the rolling surface 9 of the ring 8 has its centre on the configuration axis of the shaft 1, no bending stress is produced on the said shaft 1. On the other hand, owing to the fact that the ball bearing 15 is located on a level with the spherical ball bearing 6, 7, 8, the transverse reactions of the shaft 1 on the frame 12 are directly transmitted to this frame by the outer annular part of the cup member 10 so that the portion of this member 10 which is located between the shaft 16 and the upper part of the said member undergoes only rotation stresses. This absence of parasitical stresses in the member 10 is still rendered more complete by the fact that the member 10 is mounted in the casing 12 by means of the ball bearing 17 and of the thrust ball bearing 18, the one, 18, of the said bearings preventing the deflections of the said member 10, while the other, 17, maintains this member perfectly centered in the casing.

Instead of obliquely arranging the spherical ball bearing in the cup member 10, as shown in Figure 1, it is possible, when the pendulous shaft 1 has a small obliquity with respect to the shaft 16, simply to offset this ball bearing without arranging it obliquely, as shown in Figure 2. The inner ring 6, 7 of the spherical ball bearing being then alone perpendicular to the shaft 1, this part takes then an oblique position in the spherical outer part 9 of the bearing, while the inner ring 8 remains perpendicular to the axis 11.

The wall 21, 22 and the bell 23 prevent the dust produced by the grinding operation as well as the water from penetrating into the lower part of the machine below the said wall. Thus, a space which is entirely closed at its lower part and slightly open at its upper part is formed around the device which insures the rotation of the shaft 1, which permits of filling this space with oil up above the spherical bearing 6, 7, 8, thus insuring a perfect lubrication of all the rotating parts driving the shaft 1.

From the above it may be seen that the power which is required for actuating the machine is strictly limited to the rolling friction of the ball bearings 6, 7, 8, 15, 17 and 18, as well as to the circulation of the oil under the action of the rotation of the device in the casing 11 and in the lower part of the frame 12. In order to facilitate this circulation openings such as 24 and 25 in a more or less great number, according to the degree of circulation desired for the oil, can be provided in the walls of the cup member 10. On the other hand every parasitic flexion of the shaft 1 is avoided since this shaft can freely turn at every moment about its suspension point 2 with respect to the transmission member 10 owing to the spherical surface 9 of the ball bearing 6, 7, 8. The longitudinal displacements of the said shaft 1 with respect to the said spherical ball bearing are readily performed owing to the groove 3 and the key 4, so that neither compression nor flexion stress other than that which is adapted for producing the useful effect of the machine interferes with the operation of the latter. On the other hand the flexions of the shaft 1 which are produced under the action of the operation of the machine itself are followed without any particular stress by the inner part of the spherical ball bearing, which avoids every jamming and consequently removes a cause of heavy duty and wear for the machine. Finally, the various parts which are used in the construction of the device are of a simple construction; the ball bearings are ordinary commercial ball bearings. As it may be seen by the manner in which the machine is designed the disassembling operations are rendered very easy, the complete disassembling of the machine requiring only the removal of the pulley 20 and the separation of the casing 12 from the lower part 13 of the machine frame. The re-assembly is effected in the reverse manner with the same facility.

What I claim is:

1. A transmission device for a grinder provided with a pendulous shaft having a conical movement of rotation, the said transmission device comprising a fixed housing, a rotatable member in the form of a cup so mounted as to be able to rotate in the said fixed housing and provided with an offset recess in which is arranged the outer ring of a spherical ball bearing, the inner ring of which is at right angles to the pendulous shaft and connected with this shaft by means which can longitudinally slide with respect to the said shaft while driving the latter but which cannot rotate with respect to the said shaft, the cup member resting against the said fixed housing on a level with the spherical ball bearing by means of another ball bearing, the said cup member extending through the lower part of the said fixed housing through the medium of a rotatable packing and directly carrying a driving member outwardly of the said housing.

2. A transmission device for a grinder provided with a pendulous shaft having a conical movement of rotation, the said transmission device comprising a fixed housing, a rotatable member in the form of a cup so mounted as to be able to rotate in the said fixed housing and provided with an offset recess in which is arranged the outer ring of a spherical ball bearing the inner of which is at right angles to the pendulous shaft and connected with this shaft by means which can longitudinally slide with respect to the said shaft while driving the latter but which cannot rotate with respect to the said shaft, the cup member resting against the said fixed housing on a level with the spherical ball bearing by means of another ball bearing, the said cup member extending through the lower part of the said fixed housing through the medium of a rotatable packing and directly carrying a driving member outwardly of the said housing, the fixed housing comprising above the cup member a wall which extends upwardly so as to enclose the pendulous shaft without engaging the same, the said pendulous shaft being provided with a bell which is fitted onto the said upwardly extended part of the wall without engaging the same.

3. A transmission device for a grinder provided with a pendulous shaft having a conical movement of rotation, the said transmission device comprising a fixed housing, a rotatable member in the form of a cup so mounted as to be able to rotate in the said fixed housing and provided with an offset recess in which is arranged the outer ring of a spherical ball bearing, the inner ring of which is at right angles to the pendulous shaft and connected with this shaft by means which can longitudinally slide with respect to the said shaft while driving the same but which cannot rotate with respect to the said shaft, the cup member resting against the said fixed housing on a level with the spherical ball bearing by means of another ball bearing, the said cup member extending through the lower part of the said fixed housing through the medium of a rotatable packing and directly carrying a driving member outwardly of the said housing, and openings provided in the cup member in the lower part and in the upper part of the latter so as to permit the circulation of an oil bath located in the lower part of the fixed housing.

4. In a driving device for the pendulous shaft of a grinder such as claimed in claim 1, a connection mechanism between the inner ring of the spherical ball bearing and the pendulous shaft, comprising a ring forced into the inner ring of the spherical ball bearing and through which extends freely the pendulous shaft provided with a longitudinal groove and a key secured to the ring integral with the ball bearing and freely entering the said groove in the pendulous shaft.

5. In such a driving device for the pendulous shaft of a grinder, as claimed in claim 1, the fact of guiding the lower part of the transmission member in the form of a cup by means of a thrust ball bearing located at such a distance that the rotation axis of the said member is practically subject only to rotation stresses between the shaft which rotates it and the part of the said member which carries the spherical ball bearing of the pendulous shaft.

6. A transmission device for a grinder provided with a pendulous shaft having a conical rotation movement, the said transmission device comprising a fixed housing, a rotatable member in the form of a cup, so mounted as to be able to rotate in the said fixed housing and provided with an oblique recess which is offset and in which a spherical ball bearing is arranged at right angles to the axis of the pendulous shaft the inner ring of this ball bearing being connected with the pendulous shaft by means which can longitudinally slide with respect to the said shaft while driving the same but which cannot rotate with respect to the said shaft, the cup member resting against the said fixed housing on the level of the spherical ball bearing by means of another ball bearing, the said cup member extending through the lower part of the said fixed housing through the medium of a rotatable tight packing and directly carrying a driving member outwardly of the said housing.

7. A transmission device for a grinder provided with a pendulous shaft having a conical movement of rotation, the said transmission device comprising a fixed housing, a rotatable member in form of a cup so located as to be able to rotate in the said fixed housing and provided with an offset recess perpendicular to the axis of the rotatable member and in which is located a spherical ball bearing the inner ring of which is at right angles to the pendulous shaft and connected with this shaft by means which can longitudinally slide with respect to the said shaft while driving it but which cannot rotate with respect to the said shaft, the cup member resting against the said fixed housing on the level of the spherical ball bearing by means of another ball bearing, the said cup member extending through the lower part of the said fixed housing through the medium of a rotatable tight packing and directly carrying a driving member outwardly of the said housing.

RAYMOND ERNEST HENRI BORNAY.